April 16, 1968 F. S. CARBON 3,377,942
WAFFLE IRON
Filed May 24, 1965 2 Sheets-Sheet 1

INVENTOR
FRED S. CARBON
BY Brown, Jackson,
Boettcher & Dienner
ATTORNEYS

April 16, 1968 — F. S. CARBON — 3,377,942
WAFFLE IRON

Filed May 24, 1965 — 2 Sheets-Sheet 2

INVENTOR
FRED S. CARBON
BY
ATTORNEYS

United States Patent Office 3,377,942
Patented Apr. 16, 1968

3,377,942
WAFFLE IRON
Fred S. Carbon, Buchanan, Mich. 49107
Filed May 24, 1965, Ser. No. 458,084
10 Claims. (Cl. 99—376)

ABSTRACT OF THE DISCLOSURE

An electrically heated waffle iron in which the upper griddle is hingedly connected to the lower griddle by a pin and slot construction such that it is free to move vertically with expansion of the waffle batter so that its weight remains constant and uniformly distributed across the baking waffle and may also be readily separated from the lower griddle by simply raising and twisting it, the two griddles being of aluminum metal and each having a uniform thickness and density of the order of three to five pounds for cooking surfaces of seven inch diameter, the mass of the griddles being such that excellent tasting waffles can be baked therebetween while the two griddles are held at a temperature below 350° F. and without burning or sticking to the cooking surfaces.

---

This invention relates to an improved construction in waffle irons and more particularly to waffle irons intended for use in commercial establishments, such as restaurants, coffee shops, pancake houses and the like.

A principal object of my invention is to provide means for baking waffles so as to avoid the problems of the waffle burning on or sticking to the griddles or carbonizing.

This I have found is due to the non-uniform and/or improper heating of the waffles which characterized the usual prior art waffle iron constructions. I overcome this problem in part by casting both the upper and lower griddles of my waffle irons as thick heavy slabs of aluminum weighing three or four times that of the usual waffle iron griddles and in which I embed a resisting heating element of circular outline and series connect to a thermostat switch which I embed centrally of the lower one of said griddles. By this means I am able to maintain the temperature of the cooking surfaces of the two griddles essentially uniform and constant over their total cooking surface areas both during and between waffle bakings and so that there is a minimum heat loss. I also assure the uniform cooking of the waffle by so joining griddles at one side that the upper one is free to float on the waffle batter as it bakes between the griddles, and whereby the weight of the heated griddles is uniformly distributed across the waffle and is not concentrated more in one area thereof than in another. With the waffle irons so constructed, I find that I am able to bake waffles not only at a much lower temperature than previously, but in a shorter space of time than when using conventional irons. Furthermore, I find that the waffles which I bake neither burn on, carbonize or stick to the baking surfaces of the two griddles, and my waffle iron may be characterized as substantially self-cleaning.

More specifically, I have found that if I form the upper and lower griddles of my waffle irons so that their cooking surface wall has an average thickness approximating one-seventh their diameter, and so that in the conventional 7 inch diameter size each griddle weighs between three and five pounds, then I can bake seven inch waffles in approximately three minutes when the griddle heating elements are set to maintain a constant temperature in the range of 320 to 335° F., and not exceeding 350° F. In actual tests, I have found that after using one of my waffle irons to bake over 8,000 waffles, at the aforesaid temperature, not only did I obtain well baked waffles each time, but also the griddles had not discolored nor did they show any evidence of carbonizing.

Thus, an important feature of my invention is that I provide a waffle iron in which I am able to continuously bake waffles with assurances that each waffle will be of fine taste, of uniform color and appearance and without the necessity for having to pay careful attention to avoid burning the waffles. There is no problem of having to wait between bakings for the griddle to heat up to temperature; neither do they cool down noticeably on application of the batter, nor do they overheat during the waffle baking operation, nor between operations.

A further feature of my invention is that not only do the waffles not burn on, stick to the griddle or carbonize, but the cooking surfaces of the griddles themselves do not discolor or show evidence of prolonged repetitive use. Rather, I have found that the griddles remain clean and require little or no care other than to brush off crumbs and other loose matter. Furthermore, I obtain this improved result without having to coat or otherwise pretreat the griddle cooking surfaces.

Still another feature of my invention is that it is not necessary to constantly watch the griddle temperature so that the cooking surfaces thereof do not get too hot or cool off too quickly. Because of the thickness and weight of the griddles, I find that the temperature of their cooking surfaces remains essentially constant and each waffle takes the same predicted time to bake. Consequently, a smoothly performing cooking function is achieved and which is particularly advantageous in a commercial food serving establishment during the mealtime rush hours. Furthermore, should the waffle be kept baking longer than necessary, the waffle may overcook but it does not stick to the cooking surface and is readily separated therefrom.

A second important feature of my invention is that I have provided a free floating connection between the two griddles of my waffle iron, such that the upper griddle is free to rise with the expansion of the waffle as it cooks and in such a manner that the weight of the upper griddle remains uniformly distributed over the waffle as it cooks. This I am able to achieve without the danger of the upper griddle accidentally becoming disconnected from the lower griddle. At the same time my hinge construction is such that the upper griddle can be pivoted upwardly and out of the way for convenience in loading the lower griddle with fresh batter and/or in removing the cooked waffle therefrom. In addition, the upper griddle may be easily and readily disconnected from the lower griddle whenever desired.

A further feature of my invention is that the upper griddle can be disconnected from the lower griddle by the operator using only the hand by which he grasps the handle of the upper griddle. This means that his second hand is free for other duties.

Furthermore, the hinge structure by which I connect the two griddles is one that is simple and economical to manufacture as well as convenient to use and effective in its operation.

Still another object and feature of my invention is that I have provided a construction of waffle iron that is rugged and one not easily damaged or injured in the rough treatment and hard repetitive constant use to which such appliances are customarily put in the hurried activity of a busy establishment serving the public.

Many other objects, advantages and/or features of my invention will be at once apparent or will become so upon consideration of the preferred embodiment of my invention which will now be described in connection with the accompanying drawings.

Referring therefore to the drawings.

Figure 1:
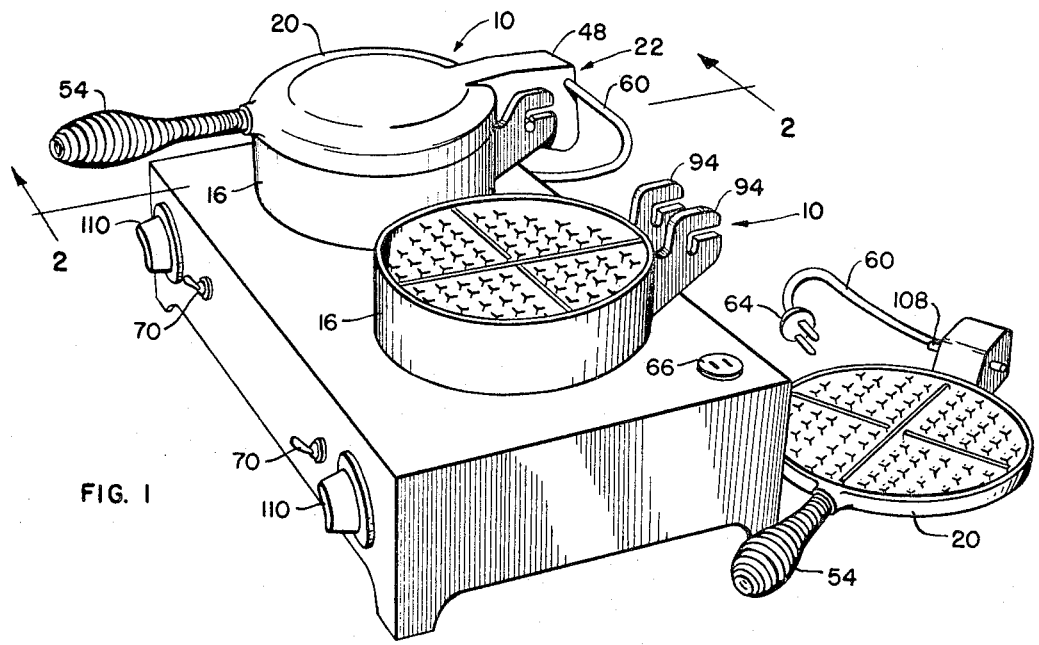
FIGURE 1 is a perspective view illustrating one embodiment of my invention in waffle iron.

Referring now to the several views which illustrate a preferred embodiment of the invention and wherein it is to be understood that like parts are identified by like reference numerals. FIGURE 1 illustrates the embodiment as comprising two waffle irons 10, each mounted side by side on a base 12. Base 12 is of generally rectangular block shape, having a top wall, also a front, rear and two opposed side walls, the corners of which are adapted as pedestals by which the embodiment may be set on a counter or other working surface. Base 12 may be fabricated of any relatively rigid material, and in the illustrated embodiment it is of stainless sheet steel. The top wall of base 12 contains two circular shaped openings 14 each of a diameter slightly smaller than the diameter of the waffle iron 10, and over which the lower griddle 16 of the waffle irons 10 are respectively aligned and fixedly secured to the base top wall as by bolts 18 (FIG. 4).

The two waffle irons 10 being identical in construction, in the following description only one waffle iron, including its electrical circuit, will be specifically described. However, it will be understood that the other waffle iron and its electrical circuit is constructed in exactly the same manner. Thus, as shown in FIGURE 1, each of said waffle irons 10 comprises a pair of griddles, that is to say an upper griddle 20 and a lower griddle 16, the latter being rigidly mounetd on base 12 as described. Also, as shown in FIGURE 1, the two griddles are joined together at their rear by means of a detachable hinge connection 22 which will be later described more in detail. It will suffice at this point to say that the hinge connection is such that the upper griddle may be swung from its illustrated baking position overlying the lower griddle to an angled or more nearly vertical position which provides convenient access to the lower griddle as for loading its baking surface with a quantity of batter and/or to permit removal of the baked waffle.

In accordance with the invention, the two griddles 16 and 20 each comprise unitary castings of aluminum formed to required shape and including their respective portion of the aforementioned hinge connection 22. In the illustrated embodiments, both griddles are of circular shape, although it is to be understood that they may also be rectangular, square, oval or other shape.

Figure 2:
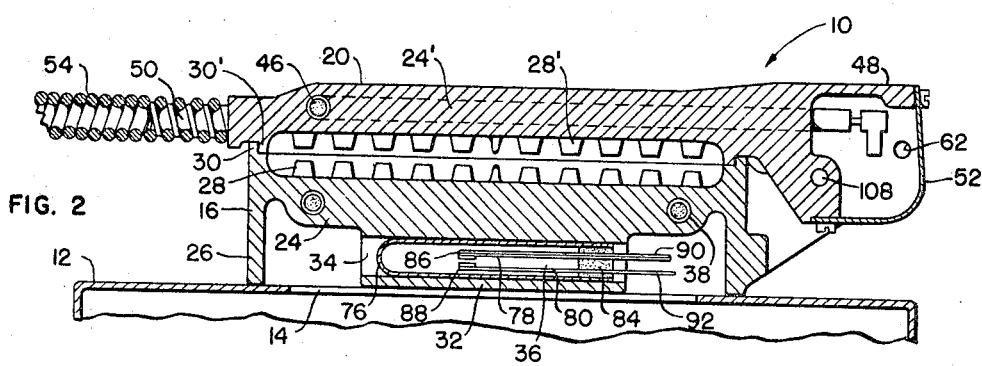
FIGURE 2 is a vertical sectional view taken through said iron along lines 2—2 of FIGURE 1.
Figure 3:
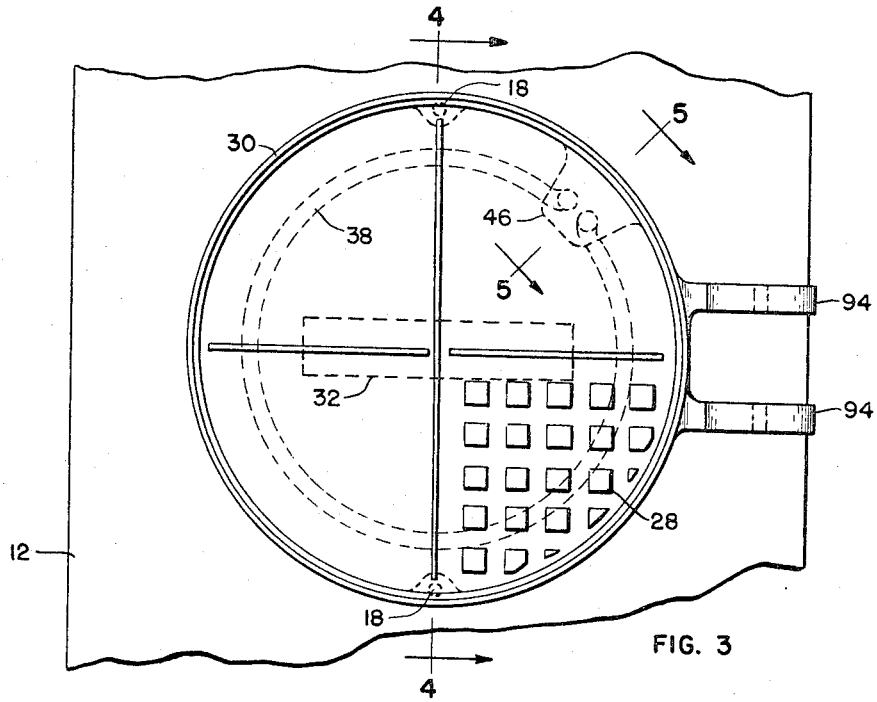
FIGURE 3 is a top plan view of the lower griddle and shows by phantom lines the disposition of the heating element and thermostatic control therefor.
Figure 4:
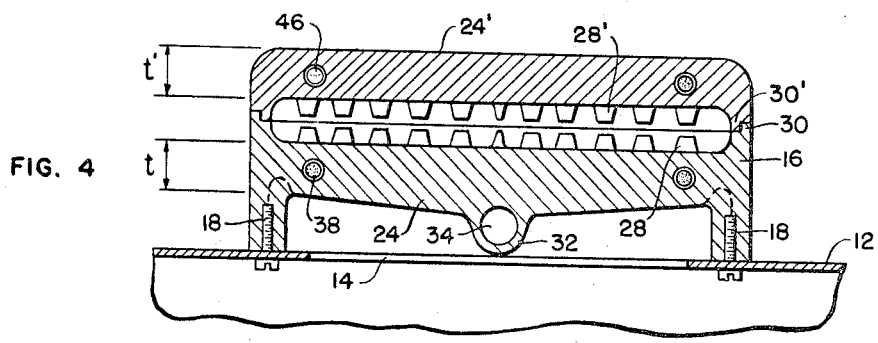
FIGURE 4 is a vertical sectional view taken through the waffle iron at the location indicated by lines 4—4 in FIGURE 3, and which section is at right angles to the section illustrated by FIGURE 2.
Figure 5:
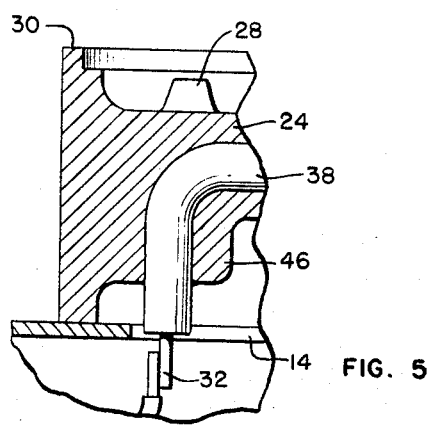
FIGURE 5 is a vertical sectional view taken along lines 5—5 of FIGURE 3 and shows details of the terminal ends of the heating elements and their disposition in the under side of the lower griddle.
Figure 8:
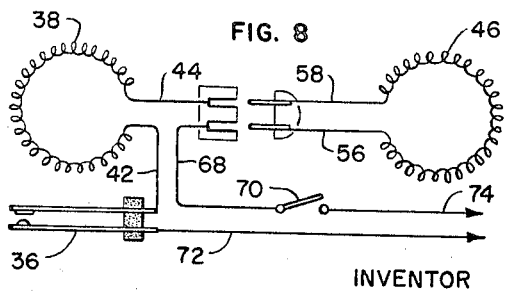
FIGURE 8 is a diagram illustrating the electrical connection of the heating elements and thermostatic switch.

The lower griddle 16, as best shown in FIGURES 2 and 4, has a hollow interior on its underside communicating with the interior of base 12 through openings 14, and comprises a relatively thick horizontaly disposed top cooking wall 24 and a thinner peripherally disposed shroud or surrounding side wall 26. The upper side of cooking wall 24 contains a plurality of transversely related recesses or grooves defining a studded cooking surface 28 enclosed by a peripherally disposed upstanding lip 30 which defines a batter receiving recess with said surface 28. The projecting studs of said surface may be of conventional pyramidal shape as illustrated. Also, if desired, they may be conical or have an oval, triangular, octagonal or any other cross section which suits the requirements of the waffle iron manufacturer. Depending centrally of the underside of said cooking wall 24 is a radially extending lug 32 having a through-bore 34 in which is mounted a thermostatic switch element 36 so as to be completely surrounded by the mass of metal comprising the cooking wall and therefore intimately influenced by the temperature thereof. As will afterwards be more specifically described, thermostatic control switch 36 is factory-set for a particular operating temperature and in accordance with this invention is not adjustable in the sense that the operator can later change the setting hereof. Within the mass of cooking wall 24, I also embed a sheathed resistance heating element 38, which as illustrated in FIGURE 3, I arrange in a circular configuration spaced inwardly of the periphery of said cooking wall 24, so that substantially the full area thereof is subject to its heating influence, the two ends of said heating element 38 being brought close together and passed downwardly through a thickened portion 40 (FIG. 5) at one side of the cooking wall. The ends of the heating element which therefore project into the interior of base 12 through the provided opening 14 in the top wall thereof are respectively attached to a pair of conductors 42 and 44 (FIG. 8). As illustrated in FIGURES 2 and 4, in accordance with the invention, the cooking wall 24 inclusive of its studded top or cooking surface 28 has a thickness represented at $t$ (FIGURE 4) which approximates one-seventh the outside diameter of said cooking wall itself, if the griddles are considered to be of circular shape as illustrated, or one-seventh the average of its horizontal dimensions if the griddles are square, rectangular, or are given other than a circular shape. Thus, for example, if cooking surface 28 of the illustrated griddle 16 is of the conventional seven inch diameter (about 39 square inches of cooling surface), thickness $t$ of the cooking wall 24 will approximate one inch and in which event the total weight of the aluminum casting comprising the lower griddle, including shroud wall 26 and its hinge connection 22 will approximate four and one half pounds.

Upper griddle 20 is of similar dimensions comprising a unitary slab of cast aluminum shaped to comprise a cooking wall 24' having a thickness approximately one-seventh its diameter and/or the average of its horizontal dimensions. The upper griddle 20 also includes the second half 48 of the hinge connection 22 on its rear wall and an integral stud 50 projecting from its forward wall to which a handle 54 may be connected, and its underside comprises a studded cooking surface 28' having a surrounding batter retaining wall or lip 30' which corresponds to cooking surface 28 and lip 30 of the lower griddle. The total weight of the upper griddle for a 7 inch size cooking wall (about 39 square inches of cooking surface) approximates 3½ pounds. Said cooking wall 24' also contains a resistance heating element 46 arranged in a generally circular form within the mass of the upper griddle cooking wall 24', the ends thereof being brought close together and extended rearwardly into the hollow of the rearward extension 48 formed integral therewith and comprising a portion of the hinge connection 22. As shown, the hollow of said extension 48 is enclosed by a cover 52, removably attached thereto as by screws. Handle 54 may be of any conventional construction, and in the illustrated embodiment comprises a coiled metal wire formation tightly gripping stud 50.

Referring now to FIGURE 8, the two ends of the heating element 46 of the upper griddle are electrically connected to conductors 56 and 58 respectively. As shown in FIGURE 1, conductors 56 and 58 are enclosed in a common insulating sheath 60 and passed through a provided opening 62 (FIG. 2) in one side wall of extension 48 and are electrically connected to respective prongs of an outlet plug 64, which frictionally engage in the receptacles of outlet connection 66 fixed at a convenient location in the top wall of base 12 (FIG. 1). Referring again to FIGURE 8, plug 64 and outlet 66 provide detachable means by which conductor 58 may be connected to conductor 44 leading to one end of heating element 38 of the lower griddle and conductor 56 to conductor 68 which connects through on-off switch 70 (FIG. 1) and conductor 72 to one side of an electrical power source to which the waffle iron is wired in the restaurant or other location where the same is used. The electrical connection of the two heating elements 38 and 46 to said power source is completed by conductor 42 which connects through thermostatic control switch 36 to conductor 74 which connects to the other side of the electrical power source. Thus, as illustrated in FIGURE 8, with plug 64 connected into outlet 66 the heating elements 38 and 46 are in series connection with each other and also with the thermostatically controlled switch 36, so that with switch 70 closed and connectors 72–74 wired to a suitable power source, the heating elements 38 and 46 will heat the two griddles and their respective cooking walls 24 and 24' to a temperature as determined by thermostatically controlled switch 36. It will be understood, however, that if desired, the two heating elements 38 and 46 also may be connected in parallel with each other, although in series with the thermostatic switch 36.

Thermostatic control switch 36 may be of any conventional construction. However, in FIGURE 2, it is illustrated as comprising housing 76 of a cross section to snugly fit within bore 34 of the lower griddle 16 and of a length so that it occupies substantially the full length thereof, although it is short enough that it does not protrude through either end thereof. Within housing 76 are a pair of spring arms 78 and 80 supported adjacent one end thereof in spaced parallel relation by pieces 84 which may be of ceramic or other electrical insulating material. The inner free ends of said spring tensioned arms 78 and 80 are provided with contacts 86 and 88 respectively and the opposed ends of said arms include portions 90 and 92 extending through said end of the housing 76 and adapted for connection to conductors 42 and 74 respectively (FIG. 8). As illustrated, arms 78 and 80 on engagement of their contacts 86, 88 complete an electrical circuit to permit energization of resistance heating elements 38 and 46. Spring arm 78 preferably comprises, or at least has associated therewith, a bimetallic element which under the influence of the temperature of portion 32 which corresponds to the temperature of the two cooking walls 24 and 24' flex to separate contacts 86, 88 and thus interrupt the electrical contact established therebetween until the two griddle cooking walls 24 and 24' sufficiently cool to again allow the contacts 86 and 88 to reestablish electrical engagement.

In accordance with the invention, the aforediscussed relative thickness of the two griddle cooking walls 24 and 24' are of such mass that once heated to the temperature at which the switch arms 78 and 80 interrupt the circuit, they are slow to cool off, wherefore the characteristics of the thermostatic control switch 36 are sufficiently sensitive that the cooking surfaces 28 and 28' of the two griddles are maintained at a substantially constant temperature and with only a minimum fluctuation of temperature change. Preferably, in accordance with the invention, the thermostatic control switch element 36 will be adjusted to maintain a temperature in the order of 325°, although a variation between 310 and 335° F. may be permitted. In any event, the temperature setting of thermostatic switch 36 should be such that the temperature of neither griddle will exceed 350° F.

Figures 6, 7:
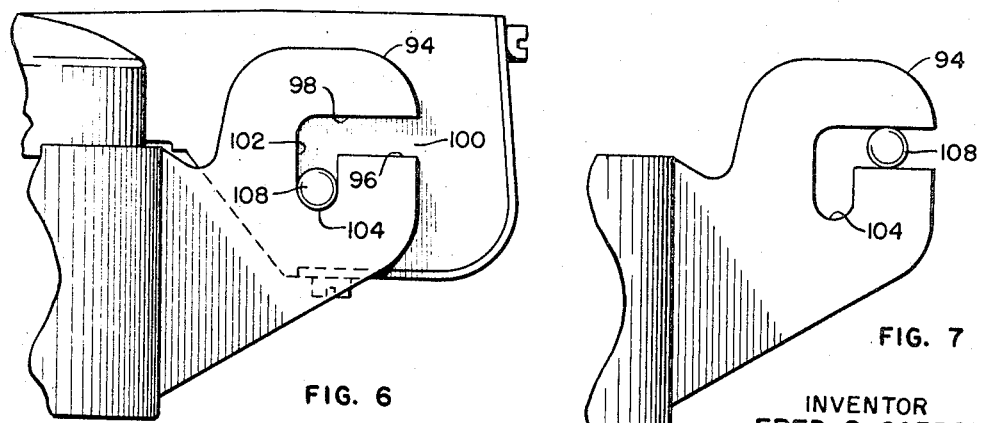
FIGURE 6 is an enlarged fragmentary view in side elevation illustrating the hinge connection of the two griddles.
FIGURE 7 is a fragmented side elevational view of the hinge connection and illustrates the manner in which the upper griddle may be disconnected from the lower griddle.

Referring now to FIGURES 6 and 7, which are to be considered in connection with FIGURE 1, the detachable hinge connection 22 by which the upper griddle is free to move vertically with respect to the lower griddle without becoming disconnected from the lower griddle, and may also be pivoted with respect thereto, will now be described. As illustrated in said figures, the portion of hinge connection 22 formed integrally with the lower griddle 16, comprises a pair of rearwardly extending spaced ears 94, each of which ears has a substantially L-shaped slot 96. Said slots 96 comprise a relatively long horizontal portion 98 communicating at one end with the rear outer edge of the ear as at 100, and at their inner end with a vertically extending portion 102, having a semi-cylindrical base 104. Said horizontal and vertical portions of the L-shaped slots 96 of the two ears, including their walls and base 96, are in essentially aligned relation. As illustrated best by FIGURE 6, the horizontal portion 98 of said slots lie in a plane essentially above lip 30 of the lower griddle 16 and a length somewhat greater than the depth of the horizontal portion thereof. The hinge ears 94 of the lower griddle also have essentially parallel inner surface walls which are spaced apart only slightly in excess of the thickness of extension 48 of the upper griddle 20 which also has vertically parallel side walls and is adapted to slidably fit in the space between the two hinge ears 94 of the lower griddle. As shown best in FIGURE 1, said extension 48 includes a rod 106 having end portions 108 which extend through its opposed side walls and constitute pintles to rest on base 104 of the vertical portion 102 of the slots 96 in the hinge ears 94 of the lower griddle and have a radius approximately that of said base 104. It will further be noted that the width of said vertical portion 102 and horizontal portion 98 of said L-shaped slots of the hinge ears 94 only slightly exceed the diameter of said pintles 108. Consequently, the two griddles may be detachably joined together by aligning the pintles 108 of the upper griddle with the entrances 100 to slots 96 of the hinge ears 94 of the lower griddle, then bodily moving the upper griddle 20 forwardly until its pintles 90, guided by the horizontal portion 98 of the slots, are aligned over the vertical portions 102 of said slots at which time the upper griddle may be simply lowered until its pintles 108 rest on the cylindrical base 104 thereof. The depth of the vertical portion 102 of the slots below the horizontal portions 98 thereof is sufficient to allow the upper griddle 20 to float on the cooking waffle batter, that is to rise with the expansion thereof as it cooks between the baking surfaces 24 and 24' of the two griddles in an essentially vertical direction, that is normal to the cooking surface 24 and 24' whereby it retains its essentially parallel relation with the lower cooking surface 28'. In this manner, the pressure of the two griddles exerted on the baking waffle remains uniformly distributed over the area of the waffle, and therefore burning or misshaping of the waffle because of a greater concentration of weight in one area thereof, is avoided as might otherwise be the case if the griddles were hinged to a fixed, rather than to a vertically moving pintle connection. I have found that in the usual baking operation the upper griddle normally does not rise more than one quarter inch. Therefore, I make the depth of vertical slot portion 102 approximately a one-half inch which is more than sufficient to accommodate the vertical rising and/or floating and guards against the possibility of the upper griddle accidently slipping rearwardly during its rise and so that pintles 108 could catch in the horizontal portions 98 of the slots with a consequent undesired effect on the waffle. At the same time the construction also facilitates pivoting of the upper griddle freedom on its pintles 108 in the horizontal portion 102 of the slots as when the operator grasps handle 54 to move the griddle 20 off the lower griddle to a vertical position to permit removing a baked waffle and/or to load the lower griddle surface 28 with a waffle batter. The hinge connection is also such that if the operator desires to remove the upper griddle from the lower griddle, he merely has to grab the upper griddle by its handle 54 and just bodily raise the griddle until its pintles 108 are aligned with the horizontal portion 98 of the slots and then move the griddle rearwardly until its pintles clear the slot entrances 100. It will be obvious that this can be done easily with one hand, while leaving the operator's other hand free for other duties.

As thus described, it will be appreciated that in accordance with the invention, I have provided a waffle iron whose upper griddle 20 is free to float on its connection with the lower griddle whereby its weight is uniformly maintained over the cooking waffle and not concentrated in one area thereof. Furthermore the mass of the cooking walls 24 and 24' of the two griddles are of sufficient bulk that once heated they do not quickly vary from the temperature determined by the thermostatic control element 36, which cooperates with the free floating connection of the upper griddle to assure not only that constant and uniform temperatures is maintained throughout both griddle surfaces 28 and 28' but that the baking waffles are thus uniformly effected. The result is that waffles can be repetitively cooked between the two griddles of my waffle iron to a uniform color, appearance and texture in a predictable time, approximately 3 minutes for a seven inch waffle baked at 325° F., and without the problems of the waffles either burning or sticking to the griddles. For convenience when using the waffle irons, I therefore also mount a mechanically operated timer 110 for each waffle iron on the front wall of the base 12, which may be set each time a respective waffle iron 10 is loaded with batter and so as to ring or otherwise give a warning signal to the operator at the end of the three minutes or other predictable time that it takes to cook or bake the waffles. Because the griddles of the waffle irons are maintained at a constant temperature below 350° F. the griddles are essentially self cleaning, that is to say the baked waffles readily separate each time from the griddle, and the batter does not stick or burn thereon even when overcooked.

Thus from the aforesaid description of a preferred embodiment invention, it will be apparent that all the recited objects and features of the invention, as well as advantages have been demonstrated as obtainable in a highly practical construction, which is also convenient and simple to operate.

Thus having described my invention, I claim:

1. An electrically heated waffle iron comprising, in combination, an upper griddle and a lower griddle hingedly connected by a vertically free floating connection which allows the upper griddle to move vertically with the expansion of the waffle batter so that its weight remains constant and uniformly distributed thereover as it cooks between the two griddles, said griddles being of aluminum metal and their cooking surfaces comprising uniformly thick solid walls having a thickness approximately one-seventh the average of their horizontal dimensions and a weight equivalent to at least about three pounds per 39 square inches of cooking surface area whereby waffles can be baked therebetween at a constant temperature below 350° F. and without burning or sticking to the cooking surfaces.

2. An electrically heated waffle iron comprising, in combination, an upper griddle and a lower griddle having facing aligned studded circular shaped cooking surfaces of about 7″ diameter, said griddles being hingedly connected by means of a free vertically floating connection which allows the upper griddle to move vertically with expansion of waffle batter cooking between the two griddles so that its weight remains constant and uniformly distributed over the waffle as it cooks, said griddles each comprising a solid uniformly thick wall of aluminum metal containing an electrical resistance heating element embedded therein and having a weight of at least three pounds, and the lower griddle further containing a thermostatically controlled switch element connected into the electrical circuit of said heating element to control the heating of the two griddles.

3. An electrically heated waffle iron as claimed in claim 2 wherein the thickness of the wall constituting the cooking surfaces of the two griddles each approximates at least one inch.

4. In an electrically heated waffle iron, a base, a first griddle supported on said base, a second griddle, and means by which said second griddle is removably hingedly connected to said first griddle so as to be pivotable between positions angularly disposed and in overlying coincident relation with the first griddle, said hinge connection means comprising a pintle carried by one griddle and a hinge ear on the other griddle having a vertically extending slot in which said pintle is slidably and pivotally received, the height of said slot being such that the second griddle is free to rise vertically with expansion of the waffle batter as it cooks between the two griddles, the weight of the second griddle thereby remaining constant and uniformly distributed over the cooking waffle, and said ear including a second slot establishing an entrance from an edge of said ear to adjacent the top of said vertically extending slot such that the pintle may be moved into and out of the vertically extending slot to permit convenient assembly and separation of the two griddles, said griddles having facing studded cooking surfaces each comprising a thick dense unitary slab of cast aluminum having an average thickness approximating one-seventh its breadth, a pair of electrically energizable heating elements, one embedded within each said slabs comprising the cooking surfaces of the griddles, circuit means connecting said heating elements to a source of electrical energy and thermostatic-controlled switch means in said circuit means mounted in thermo-sensitive relation with the underside of the cooking surface of the first griddle and adapted to maintain the temperature of said cooking surfaces near 325° F. when the heating elements thereof are connected by the electrical circuit means to a source of electrical energy, said slabs comprising the two cooking surfaces having a mass in the order of about three pounds per 39 square inches of cooking surface area such that they are uniformly maintained at said temperature throughout the full area of the cooking surfaces and with minimum heat loss such waffles may be baked therebetween at said temperature in about three minutes without carbonizing and sticking to the cooking surfaces.

5. In an electrically heated waffle iron, a base, a first griddle supported on said base, a second griddle, and means hingedly connecting said second griddle to said first griddle such that it is disposable in overlying coincident relation therewith and is free to rise vertically with expansion of the waffle batter as it cooks between the two griddles and such that the weight thereof remains constant and uniformly distributed over the cooking waffle, said griddles having facing studded cooking surfaces of generally circular shape, each comprising a uniformly thick solid unitary slab of cast aluminum and an encircling electrically energizable heating element embedded within each said slabs, and circuit means including a thermostatic switch element for connecting said heating elements to a source of electrical energy, said thermostatic switch element being contained within the mass of the slab comprising the first griddle and centrally of the heating element embedded therein, said slabs each having a weight of at least three pounds per 39 square inches of cooking surface and a sufficient thickness relative to their diameter that heat losses are minimized and the temperature of their cooking surfaces are maintained uniform and constant throughout the area thereof.

6. In an electrically heated waffle iron, a base, a first griddle comprising a uniformly thick dense slab of cast aluminum having a studded horizontal upper cooking surface and a depending wall thereabout secured to said base, a second griddle comprising a uniformly thick dense slab of cast aluminum having a studded cooking surface on its underside shaped to coincide with the cooking surface of the first griddle when disposed thereover in its normal position of use, said first griddle having spaced rearwardly extending integral hinge ears provided with parallel vertically extending inner planar sides, the second griddle having a single rearwardly extending integral lug provided with parallel vertically extending outer planar sides, the outer sides of said lug slidably interfitting within the space between the inner sides of the hinge ears of the first griddle, said lug having a pair of axially aligned cylindrical pintle-constituting horizontally disposed pins projecting from its outer planar sides, and the hinge ears of the first griddle having L-shaped slots with aligned horizontal and vertical portions, the horizontal portion of said slots having upper and lower walls spaced apart a distance only slightly greater than the diameter of said cylindrical pins and including a mouth interrupting the rear edge of said hinge ears dimensioned to permit the pins to enter therethrough when the lug is aligned with and moved into the space between said hinge ears, the vertical portion of said slots communicating at their upper end with said horizontal portion of the slots and having correspondingly spaced forward and rearward walls, the bottom end of said vertical portion of the slots being rounded to a curvature corresponding to the cylindrical shape of the pins, said second griddle being thereby readily and conveniently connectable to the first griddle by aligning the pins of its lug with the mouth of the L-shaped slots of the hinge ears of the first griddle member and bodily moving the second griddle forwardly until the pins are aligned for reception within the vertical portion of the slots and lowering the second griddle into a position of rest on the first griddle, said pins engaging on the rounded bottom end of said vertical portion of the L-shaped slots so as to accommodate rocking movement of the second griddle, and the separation of the second griddle from its hinged connection with the first griddle being readily accomplished by bodily moving the second griddle in reverse first upwardly and then rearwardly with respect to the first griddle.

7. In an electrically heated waffle iron as claimed in claim 6 wherein each of said slabs of cast aluminum comprising the first and second griddles contains an electrically energizable heating element, at least the first griddle having a temperature sensing thermostat associated therewith, and said temperature sensing thermostat being operatively connected to the heating elements so as to maintain the temperature of the cooking surfaces of said griddles at a predetermined temperature, and the mass of said griddles being represented by a weight of from three to five pounds and a thickness of at least one inch for a seven inch diametered cooking surface such that there is a minimum of heat loss and the cooking surfaces of said griddles may be held at a predetermined constant temperature.

8. In an electrically heated waffle iron as claimed in claim 6, wherein each of said slabs of cast aluminum comprising the first and second griddles further contains an encircling electrically energizable heating element embedded therein, and the slab comprising the first griddle also has a centrally disposed projection on its underside with a radially disposed horizontal bore therethrough, the temperature sensing thermostat being mounted within said bore and operatively connected with both said heating elements, the mass of said griddles being represented by a weight of from three to five pounds and a thickness of at least one inch for a seven inch diametered cooking surface such that the thermostat holds the temperature of said cooking surfaces essentially constant and with a minimum of heat losses.

9. An electrically heated waffle iron as claimed in claim 2 wherein the griddles are pivotally connected by means which include a pair of spaced hinge ears on the first griddle having vertically aligned slots and a lug on the second griddle which slidably fits between said hinge ears and has axially aligned pins projecting from its two sides which are received within said vertically extending slots such that the second griddle is free to rise vertically relative to the first griddle with expansion of the baking waffle batter and may also be pivoted relative thereto to permit removal of the baked waffle, said hinge ears further having entrances to said vertically extending slots adjacent the upper ends thereof which communicate with an outer edge of said hinge ears so as to accommodate ready and convenient separation of the second griddle from the first griddle.

10. In an electrically heated waffle iron, a base, a first griddle supported on said base, a second griddle, and means hingedly connecting said second griddle to said first griddle such that it is disposable in overlying coincident relation therewith and is free to rise vertically with expansion of the waffle batter as it cooks between the two griddles and such that the weight thereof remains constant and uniformly distributed over the cooking waffle, said griddles having facing cooking surfaces, each comprising a uniformly thick solid unitary slab of cast aluminum, an electrically energizable heating element embedded within each said slabs, and circuit means including a thermostatic switch element for connecting said heating elements to a source of electrical energy, said thermostatic switch element being contained within the mass of the slab comprising the first griddle and centrally of the heating element embedded therein, said slabs each having a weight in the order of about three pounds per thirty-nine square inches cooking surface area and sufficient thickness relative to their diameter that heat losses are minimized and the temperature of their cooking surfaces is maintained uniform and constant throughout the area thereof.

References Cited
UNITED STATES PATENTS

| | | | |
|---|---|---|---|
| 1,534,430 | 4/1925 | Wells | 99—378 |
| 1,534,431 | 4/1925 | Wells | 99—378 |
| 1,661,294 | 3/1928 | Lemaster | 99—376 |
| 1,982,410 | 11/1934 | Atkinson. | |
| 2,009,790 | 7/1935 | Shroyer | 99—378 |
| 2,269,844 | 1/1942 | Clemons | 99—374 |
| 2,584,173 | 2/1952 | Van Fowler | 16—166 X |
| 2,743,665 | 5/1956 | Gustafson | 99—374 X |
| 3,097,029 | 7/1963 | Lotz et al. | 16—179 X |

BILLY J. WILHITE, *Primary Examiner.*